UNITED STATES PATENT OFFICE.

JACOB STEPHAN, OF BOSTON, MASSACHUSETTS, ASSIGNOR TO HIMSELF AND P. AUGUSTUS SCWARZE.

IMPROVEMENT IN CEMENTS FOR GRINDING-CYLINDERS.

Specification forming part of Letters Patent No. 8,474, dated October 28, 1851.

*To all whom it may concern:*

Be it known that I, JACOB STEPHAN, of Boston, in the county of Suffolk and State of Massachusetts, have invented a certain new and useful Composition and the Manner of Applying the Same to Grinding-Surfaces; and I do hereby declare that the following is a full, clear, and exact description of the principle or character which distinguishes them from all other things before known, and of the usual manner of making, modifying, and using the same.

The nature of my invention consists, first, in the peculiar compound I employ; and, second, in the manner of employing it in the manufacture of the grinding-cylinders for carding-machines and other purposes, or other metallic or wooden or any other surfaces wherever it is employed.

My composition, which is for the purpose of firmly holding on the emery that forms the grinding-surface, is composed of the following ingredients, and I find the proportions herein stated to be practically efficient, although they may be varied, perhaps, without materially affecting the result: I take one quart of pure milk and boil it, to which I add about a half-pint of vinegar, which causes it to curdle. This compound I strain through a filter and take the whey and add thereto a pint of dissolved glue and a half-gill of spirits of wine and about thirty drams of sulphuric ether, and mix the whole together, and the compound is ready for use. To apply the same for use in the case of cylinders for grinding, I take the cast-iron or other cylinders and heat it by steam or otherwise, and to about 300°, more or less. I then give it a coat of copal varnish and emery, and let it dry, after which I apply a coating of glue and emery, either fine or coarse, which must be heated. This coat is moistened by means of a sponge with the composition above described, and then a second coat of emery is added, and it is then smoothed and made even and cylindrical by applying a steel straight-edge to its surface, after which I turn the cylinder slowly till it is dry to prevent the glue from settling out of true, and then let it dry for some hours. After it is thoroughly dry I repeat the application of the composition if the cylinder has not the thickness required, &c. If a wooden cylinder is used, the copal varnish is omitted as a preliminary application. In the case of old cylinders that have been in use the composition is applied without any previous preparation over the old emery. Cylinders prepared as above run much longer than those heretofore used, and will last from two to five years. When they get soiled they may be made ready for use in two or three hours by washing them with spirits of turpentine. The cylinders that are thus made receive the most perfect outline and retain it, and consequently cards ground by them will last much longer than by the ordinary cylinders.

Having thus fully described my improved composition and the manner of applying it, what I claim therein as new, and for which I desire to secure Letters Patent, is—

1. The composition herein described, consisting of the whey of milk, vinegar, glue, spirits of wine, and ether, substantially in the manner and for the purpose set forth.

2. The combination thereof with emery to construct a grinding-cylinder or other surface, in the manner described.

JAC. STEPHAN.

Witnesses:
T. C. DONN,
FRIEDRICK SCHMIDT.